Jan. 19, 1943.　　　G. H. VICKERY　　　2,308,575
ATTACHMENT FOR CULTIVATORS
Filed July 22, 1939　　　2 Sheets-Sheet 1

George H. Vickery
INVENTOR.

BY　Elwin M. Hulse

ATTORNEY.

Jan. 19, 1943.   G. H. VICKERY   2,308,575
ATTACHMENT FOR CULTIVATORS
Filed July 22, 1939   2 Sheets-Sheet 2
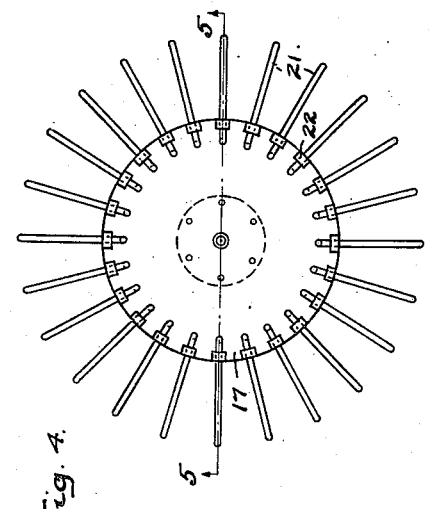
Fig. 4.
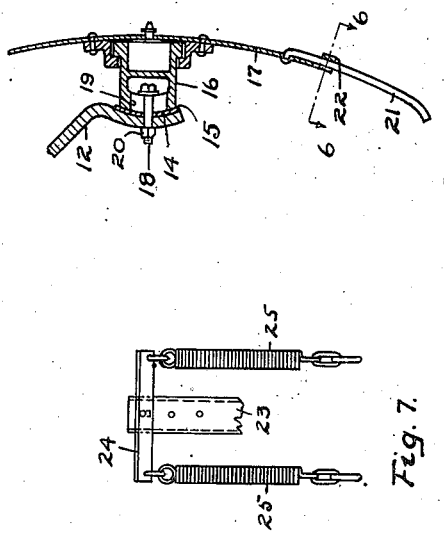
Fig. 5.
Fig. 7.
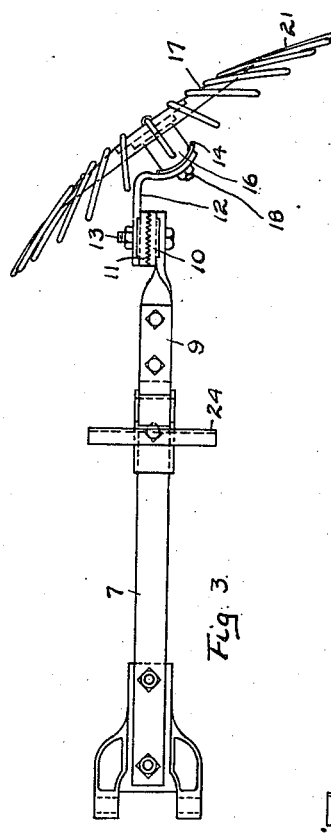
Fig. 3.
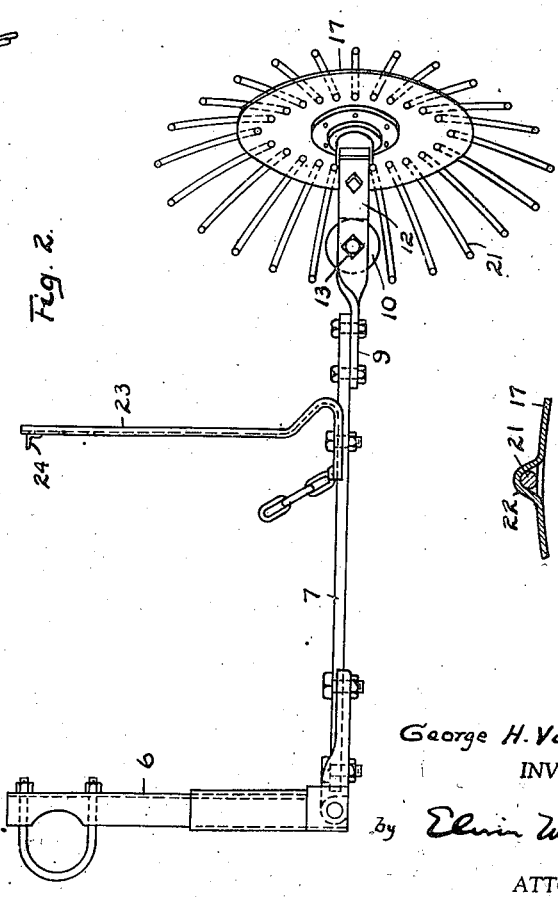
Fig. 2.
Fig. 6.
George H. Vickery
INVENTOR.
by
ATTORNEY.

Patented Jan. 19, 1943

2,308,575

UNITED STATES PATENT OFFICE 2,308,575

ATTACHMENT FOR CULTIVATORS

George H. Vickery, near Bluffton, Ind.

Application July 22, 1939, Serial No. 285,895

2 Claims. (Cl. 97—179)

The invention relates generally to agricultural implements of the nature of cultivators and particularly to an attachment for such implements designed to remove clods and soil from the plants deposited thereon by the cultivator.

The cultivator now in general use for loosening the soil and killing weeds between rows of growing crops frequently causes the clods and soil turned up by its shovels to cover the plants. This covering must be removed otherwise the plants will be injured or their growth affected.

The object of my invention is to provide a cultivator with means by which the clods and soil deposited on the plants by the shovels of the cultivator may be easily, rapidly and effectively removed from the plants, as the implement is moved along, without injury to the plants.

The invention consists in the novel means for accomplishing the foregoing objects hereinafter fully described and pointed out in the claims, an embodiment of the invention being illustrated in the accompanying drawings in which Figure 1 is a perspective view of a cultivator having the invention applied thereto.

Fig. 2 is a side elevation of the clod and soil removing mechanism.

Fig. 3 is a plan view of the device shown in Fig. 2.

Fig. 4 is a side view of the disc.

Fig. 5 is a fractional cross-section on line 5—5 of Fig. 4.

Fig. 6 is a cross-section on line 6—6 of Fig. 5, and

Fig. 7 is an elevation of the resilient connection between the mechanism shown in Fig. 2 and the cultivator.

Figure 1:
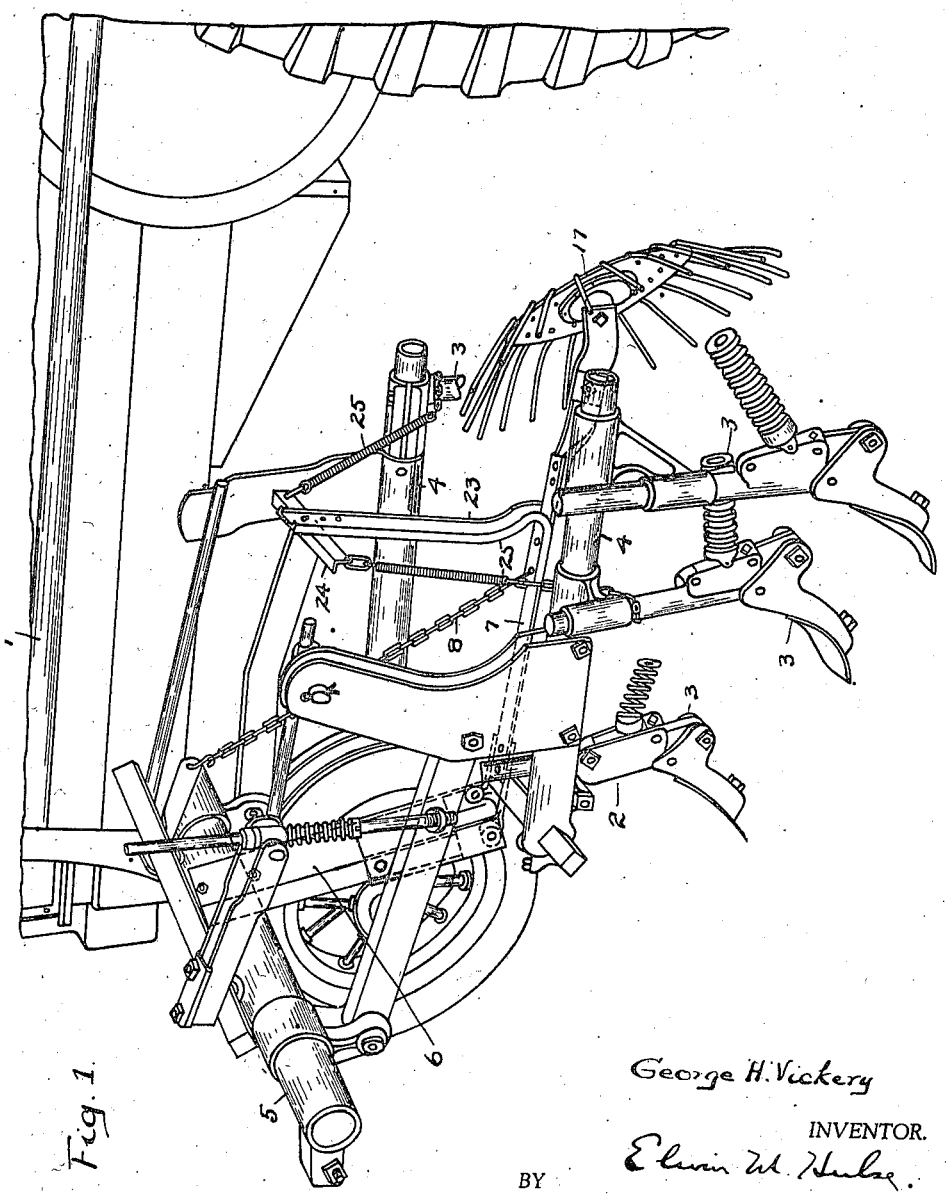

Referring to the illustrative embodiment of the invention, 1 represents a fraction of a tractor and 2 is a well known cultivator mechanism mounted on the tractor, having three shovels 3 on each side arranged on the supports 4. The supports 4 are suitably mounted on the cross member 5.

A support 6 is mounted on the cross member 5 and depends therefrom. A bar 7 is pivotally connected at its forward end to the support 6 and a chain 8 is connected to an arm on the member 5 and to the bar 7, by which chain the rear portion of the bar is supported.

The bar 7 is approximately midway between the rows of shovels or the vertical planes thereof. An extension bar 9 is secured at one end to the rear end of the bar 7 and at its opposite end is secured or formed a jaw 10 adapted to adjustably engage a jaw 11 secured to an arm or bar 12. The bolt 13 holds the jaws in engagement with each other. The rear end of the arm 12 is curved laterally to form a seat 14 for the convex end member 15 of the spindle 16 upon which the disc 17 is revolubly mounted. The bolt 18 passes through the seat 14, the end member 15 and the slot 19 formed in the hollow spindle, provision being made for the insertion of the bolt into the spindle. This bolt and the nut 20 thereon lock the spindle to the arm in adjusted position.

The disc 17 is dished with its concave side facing the spindle. A series of radial, longitudinally curved rods 21 project from the periphery of the plate, the inner end of each rod being bent laterally and extended through an opening in the plate and welded or otherwise secured thereto. The disc adjacent its peripheral edge is bowed rearwardly at intervals to form the cleats 22 through which the rods or teeth extend and by which the rods are held against any swinging movement on the disc.

By adjusting the jaw 11 on the jaw 10 the disc is raised or lowered, and the angularity of the disc with respect to the bar 7 is regulated by adjusting the spindle 16 on the arm 12. The disc is adjusted to cause the rods or teeth 21 to contact the ground and its angularity is fixed as may be desired. As the implement is moved forwardly the teeth of the disc engage the ground causing the disc to rotate. Since the shovels are operating on opposite sides of the row of plants and the disc is intermediate the shovels, the disc travels along the row of plants and its teeth engage the clods and soil progressively which may be projected by the shovels onto the plants and lift, push or move them to one side of the row without injuring the plants.

The disc 17 is not only disposed on the frame at an angle to the longitudinal axis of the frame but is inclined forwardly so that its teeth or prongs lift the clods that they engage and move them away from the plants.

To compensate uneven conditions of the ground, a standard 23 is secured to the bar 7 and a cross bar 24 is secured at a desirable point to the standard. Two springs 25 are attached to the cross bar 24 and their lower ends are connected to convenient parts of the cultivator, as to the shovel supports. Any upward movement of the bar 7 will be opposed by the springs and hence the springs tend to retain the relative positions of the disc and the shovels.

The disc and its supporting frame are readily applied to or removed from the cultivator. They may be applied to any cultivator whether power driven or horse drawn and could be applied to a hand operated cultivator.

What I claim is:

1. An attachment for cultivators comprising a frame having pivotal connection at its forward end with the cultivator, a bracket pivotally mounted at one end for adjustment in a vertical plane on the rear end of the frame, the opposite end of the bracket being bent laterally and having a curved face on its rear side, a hollow spindle having a companion face adjustably held against said curved face of the bracket and a disk revolubly mounted on the spindle, the disk having a plurality of prongs projecting from its periphery.

2. An attachment for cultivators comprising a frame having pivotal connection at its forward end with the cultivator, a bracket pivotally mounted at one end for adjustment in a vertical plane on the rear end of the frame, the opposite end of the bracket having a laterally curved face on its rear side, a hollow spindle having a companion face adjustably held against said curved face of the bracket, a disk freely rotatable on the spindle and having a plurality of forwardly curved prongs projecting from its periphery and a pair of springs suspended on the frame and adapted to be connected to the cultivator on opposite sides of the frame and intermediate the ends thereof.

GEORGE H. VICKERY.